US010831859B2

(12) United States Patent
Van Wiemeersch et al.

(10) Patent No.: US 10,831,859 B2
(45) Date of Patent: Nov. 10, 2020

(54) HARDWARE AND CONTROLS FOR PERSONAL VEHICLE RENTAL

(71) Applicant: Ford Global Technologies, LLC, Dearborn, MI (US)

(72) Inventors: John Robert Van Wiemeersch, Novi, MI (US); Robert Bruce Kleve, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2442 days.

(21) Appl. No.: 13/670,525

(22) Filed: Nov. 7, 2012

(65) Prior Publication Data

US 2014/0129113 A1 May 8, 2014

(51) Int. Cl.
*G06F 17/00* (2019.01)
*G06Q 10/06* (2012.01)
*G06Q 30/06* (2012.01)
*F02D 28/00* (2006.01)

(52) U.S. Cl.
CPC ............. *G06F 17/00* (2013.01); *F02D 28/00* (2013.01); *G06Q 10/06* (2013.01); *G06Q 30/0645* (2013.01)

(58) Field of Classification Search
CPC .... G06F 17/00; G06Q 30/0645; G06Q 10/06; F02D 28/00
See application file for complete search history.

(56) References Cited

U.S. PATENT DOCUMENTS 5,070,959 A * 12/1991 Grabowski .............. B60K 6/46
180/167
5,519,260 A 5/1996 Washington
(Continued)

FOREIGN PATENT DOCUMENTS

CN 101527061 A 9/2009

OTHER PUBLICATIONS

Pisano—"Road Weather and the Connected Vehicle Improving Road Weather Awareness" Publication #: FHWA-JPO-11-138; 2011; 2 Pages.

(Continued)

*Primary Examiner* — Phutthiwat Wongwian
*Assistant Examiner* — Sherman D Manley
(74) *Attorney, Agent, or Firm* — Michael Spenner; Brooks Kushman P.C.

(57) ABSTRACT

In a first illustrative embodiment, a processor operably programmed and configured to receive input defining one or more vehicle parameters to monitor and control during a vehicle rental. The processor may monitor and control the vehicle parameters during a vehicle rental period starting when an authorized user keylessly activates a vehicle during a defined start time. The processor may control driver behavior by limiting vehicle performance based on a predefined threshold of one or more vehicle parameters. The monitoring and control may continue until the rental period has expired or when the vehicle is returned to a predetermined geographic area designated by the vehicle owner. The processor may initiate wireless communication of the vehicle parameters to a vehicle rental administrative system through a cellular telephone located in proximity to the vehicle.

20 Claims, 11 Drawing Sheets

(56) References Cited

U.S. PATENT DOCUMENTS

| | | | |
|---|---|---|---|
| 5,650,930 A * | 7/1997 | Hagenbuch | G08G 1/20 177/141 |
| 5,877,455 A * | 3/1999 | Kyrtsos | G01G 19/12 177/1 |
| 5,944,631 A * | 8/1999 | Schafer | F16H 59/08 477/115 |
| 6,052,644 A * | 4/2000 | Murakami | B60K 31/0058 123/319 |
| 6,089,452 A | 7/2000 | Rhode, III | |
| 6,141,610 A | 10/2000 | Rothert et al. | |
| 6,154,658 A | 11/2000 | Caci | |
| 6,157,315 A | 12/2000 | Kokubo et al. | |
| 6,198,996 B1 * | 3/2001 | Berstis | B60R 25/2018 701/36 |
| 6,329,901 B2 * | 12/2001 | Brinkmeyer | B60R 25/04 340/426.17 |
| 6,556,905 B1 | 4/2003 | Mittelsteadt et al. | |
| 6,571,197 B1 * | 5/2003 | Frank | G01G 19/021 702/173 |
| 6,646,210 B1 * | 11/2003 | Wissing | G01G 19/08 177/136 |
| 6,701,231 B1 * | 3/2004 | Borugian | B60R 25/04 307/10.2 |
| 6,721,680 B2 * | 4/2004 | Sorrells | G01G 19/08 477/120 |
| 6,736,322 B2 | 5/2004 | Gobburu et al. | |
| 6,885,935 B2 * | 4/2005 | MacPhail | G08G 1/0104 701/117 |
| 6,975,997 B1 * | 12/2005 | Murakami | B60L 11/1824 705/5 |
| 7,113,081 B1 * | 9/2006 | Reichow | G01G 23/005 340/425.5 |
| 7,233,857 B2 | 6/2007 | Cahoon | |
| 7,812,712 B2 | 10/2010 | White et al. | |
| 7,813,843 B2 * | 10/2010 | Patel | G08G 1/00 701/1 |
| 7,956,730 B2 * | 6/2011 | White | A61B 5/117 180/272 |
| 8,930,124 B1 * | 1/2015 | Ferreira | G08G 1/052 701/117 |
| 2002/0033289 A1 * | 3/2002 | Ono | B60K 31/04 180/171 |
| 2002/0084887 A1 * | 7/2002 | Arshad | B60R 25/04 340/5.61 |
| 2002/0156553 A1 | 10/2002 | Read | |
| 2002/0174077 A1 * | 11/2002 | Yui | G06Q 20/127 705/400 |
| 2003/0034873 A1 | 2/2003 | Chase et al. | |
| 2003/0060966 A1 * | 3/2003 | MacPhail | G08G 1/0104 701/117 |
| 2003/0095046 A1 * | 5/2003 | Borugian | B60R 25/33 340/576 |
| 2003/0097218 A1 * | 5/2003 | Borugian | B60R 25/04 701/468 |
| 2003/0102958 A1 | 6/2003 | Gudmundsson | |
| 2003/0120455 A1 * | 6/2003 | Sorrells | G01G 19/08 702/174 |
| 2004/0006498 A1 | 1/2004 | Ohtake et al. | |
| 2004/0039612 A1 | 2/2004 | Fitzgerald et al. | |
| 2004/0049333 A1 * | 3/2004 | Kustosch | B60K 31/047 701/93 |
| 2004/0073357 A1 * | 4/2004 | Schliep | F02D 41/021 701/1 |
| 2004/0094622 A1 | 5/2004 | Vismara | |
| 2004/0254698 A1 * | 12/2004 | Hubbard | G08G 1/0104 701/32.7 |
| 2005/0149742 A1 | 7/2005 | Weis | |
| 2006/0259353 A1 | 11/2006 | Gutmann | |
| 2007/0149184 A1 * | 6/2007 | Viegers | G06Q 10/06 455/422.1 |
| 2008/0186166 A1 * | 8/2008 | Zhou | G01S 5/0027 340/539.13 |
| 2008/0245598 A1 * | 10/2008 | Gratz | B60R 25/1004 180/287 |
| 2009/0015373 A1 | 1/2009 | Kelly et al. | |
| 2009/0037047 A1 * | 2/2009 | Hawkins | B60W 10/02 701/36 |
| 2009/0144151 A1 | 6/2009 | Pajot | |
| 2009/0177577 A1 | 7/2009 | Garcia | |
| 2009/0287596 A1 | 11/2009 | Torrenegra | |
| 2010/0106534 A1 | 4/2010 | Robinson et al. | |
| 2010/0148920 A1 * | 6/2010 | Philmon | H04M 1/67 340/5.2 |
| 2010/0201545 A1 * | 8/2010 | Narea | G08G 1/20 340/936 |
| 2010/0217630 A1 * | 8/2010 | Ehrman | G06Q 10/02 705/5 |
| 2011/0022422 A1 | 1/2011 | Taylor | |
| 2011/0068739 A1 | 3/2011 | Smith | |
| 2011/0112969 A1 * | 5/2011 | Zaid | G06Q 10/02 705/50 |
| 2011/0137520 A1 * | 6/2011 | Rector | H04M 1/72577 701/36 |
| 2011/0153143 A1 * | 6/2011 | O'Neil | A01B 69/007 701/31.4 |
| 2011/0213629 A1 * | 9/2011 | Clark | G06Q 10/02 705/5 |
| 2011/0215899 A1 | 9/2011 | VanWiemeersch et al. | |
| 2011/0215901 A1 * | 9/2011 | Van Wiemeersch | B60R 25/04 340/5.54 |
| 2011/0288891 A1 * | 11/2011 | Zaid | G06Q 10/02 705/4 |
| 2011/0307375 A1 * | 12/2011 | Maney | B60R 25/00 705/39 |
| 2011/0313937 A1 * | 12/2011 | Moore, Jr. | G06Q 30/0645 705/307 |
| 2012/0191511 A1 * | 7/2012 | Li | H04W 4/046 705/13 |
| 2013/0073349 A1 * | 3/2013 | Kolling | G07B 15/02 705/13 |
| 2013/0317693 A1 * | 11/2013 | Jefferies | G07B 15/00 701/31.5 |
| 2013/0321178 A1 * | 12/2013 | Jameel | G08G 1/202 340/989 |
| 2013/0325521 A1 * | 12/2013 | Jameel | G06Q 10/02 705/5 |

OTHER PUBLICATIONS http://www.zipcar.com; "Is car sharing for you? Zipcar replaces corporate car leasing and car rental"; Jun. 2000; 2 Pages.

https://relayrides.com—"How Borrowing Works—RelayRides"; Oct. 2009; 1 Page.

Beer—"Road Weather and the Connected Vehicle Improving Road Weather Awareness" Publication #: FHWA-JPO-11-138; Nov. 2011; 2 Pages.

* cited by examiner

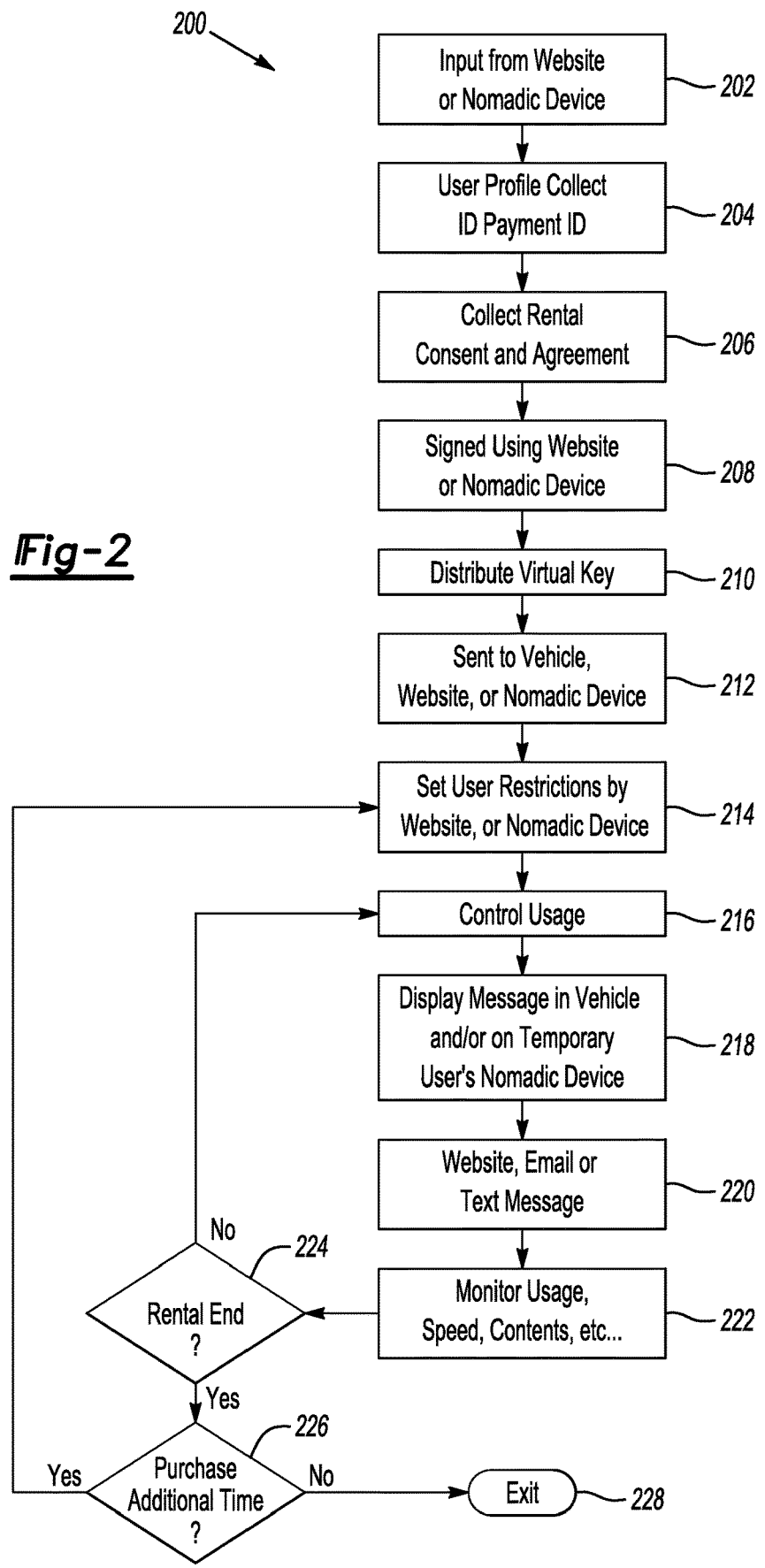

HARDWARE AND CONTROLS FOR PERSONAL VEHICLE RENTAL

CROSS-REFERENCE TO RELATED APPLICATIONS

This application is related to Ser. No. 13/670,527, MOBILE AUTOMOTIVE WIRELESS COMMUNICATION SYSTEM ENABLED MICROBUSINESSES filed concurrently with Ser. No. 13/670,523 CREDENTIAL CHECK AND AUTHORIZATION SOLUTIONFOR PERSONAL VEHICLE RENTAL

TECHNICAL FIELD

The embodiments described herein generally relates to a method and system for monitoring a vehicle rental micro-business.

BACKGROUND

RelayRides.com allows car owners to list their car online in a few minutes to potential Temporary Users. Once registered, the car owner is notified of any reservation requests, however the owner is still in charge of who can drive their car. The car owner will meet the Temporary User to hand them their car keys, and once the Temporary User is complete with the car at the end of the trip, the car and keys are returned to the car owner.

Ridejoy.com allows a car owner to list available seats in their car online to potential passengers. The owner, who already is planning a road trip, may sell their extra seats to other users. Owners earn money on trips they were planning on taking anyway and the passenger who rented the available seat gets to their destination for less than they would have had to pay riding a bus.

As stated in US2011/0213629, an online site allows owners of assets and borrowers of assets to arrange sharing transactions with respect to the assets. Assets listed on the online site may include any kind of land, sea or airborne vehicle, tools, equipment or other devices subject to being moved. Online confirmation is provided to the owners and the borrowers that the arranged sharing transactions have been covered by insurance provided by the online site. Completion of the arranged sharing transactions is managed using information from electronic devices associated with the assets.

As stated in U.S. Pat. No. 6,975,997, a system for sharing a fleet of vehicles among a plurality of users, where in preferred embodiments of the shared vehicles are electrically powered. The sharing system comprises a control computer that assigns vehicles in response to requests by users, and monitors system performance of the rented vehicle. The computer subsystem through which users request vehicles for trips, and a vehicle subsystem within each vehicle that is in communication with the control computer allowing the control computer to monitor the location and status of each vehicle in the vehicle sharing fleet.

SUMMARY

In a first illustrative embodiment, a processor operably programmed and configured to receive input defining one or more vehicle parameters to monitor and control during a vehicle rental. The processor may monitor and control the vehicle parameters during a vehicle rental period starting when an authorized user keylessly activates a vehicle during a defined start time. The processor may control driver behavior by limiting vehicle performance based on a pre-defined threshold of one or more vehicle parameters. The monitoring and control may continue until the rental period has expired or when the vehicle is returned to a predetermined geographic area designated by the vehicle owner. The processor may initiate wireless communication of the vehicle parameters to a vehicle rental administrative system through a cellular telephone located in proximity to the vehicle.

In a second illustrative embodiment, a processor operably programmed and configured to receive an input defining one or more vehicle parameters to limit vehicle performance during a vehicle rental period. The processor may monitor the vehicle parameters during a vehicle rental period and limit vehicle performance if a parameter exceeds a pre-defined threshold during the vehicle rental period. The threshold may have been dynamically set for the rental period following an agreement between a vehicle owner and a renter not to exceed the threshold.

In a third illustrative embodiment, a computer-implemented method includes configuring at least one processor to receive an input defining one or more vehicle parameters in the processor to monitor. The exemplary method may monitor the vehicle parameters during a vehicle rental period, wherein the rental period begins when an authorized user keylessly activates a vehicle during a defined start time and ends when a vehicle is powered down following either a predetermined end time or when a vehicle is returned to a predetermined geographic area. The computer program may format the monitoring data for communication of the vehicle parameters to a vehicle rental administrative system through a cellular telephone, located in proximity to the vehicle and in wireless communication with the processor.

BRIEF DESCRIPTION OF THE DRAWINGS

FIG. 2 is a flow-chart illustrating an example method of a vehicle rental micro-business;

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
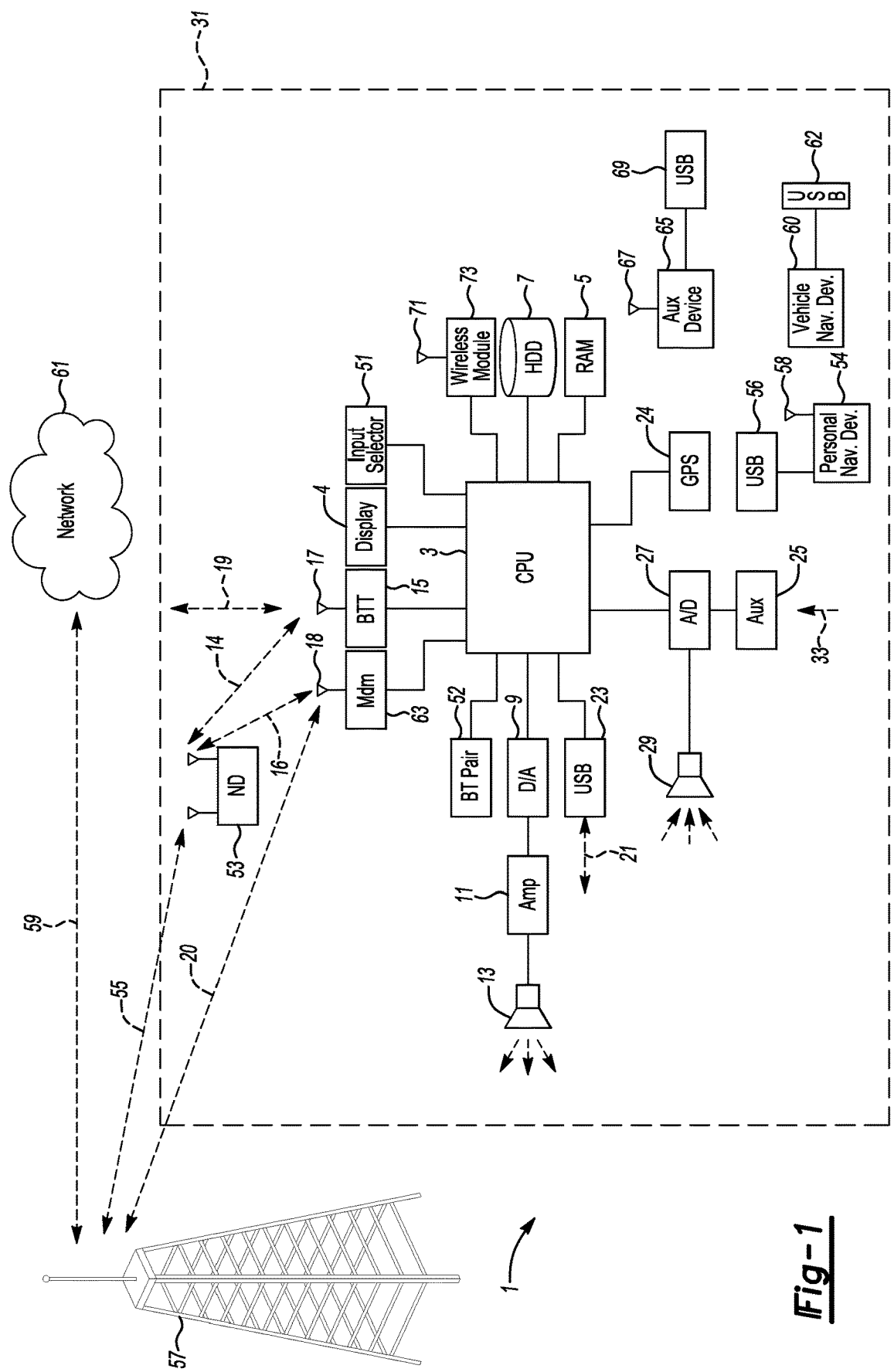
FIG. 1 is an exemplary block topology of a vehicle infotainment system implementing a user-interactive vehicle information display system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24, touchscreen visual display 4 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a touchscreen visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a cellular telephone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In the illustrative embodiment as shown in FIG. 2 is an overview of the several steps that may contribute to the process of a vehicle rental micro-business integrated with a VCS. The process of a vehicle rental micro-business integrated with a computing system may be applied, but not limited to, automobiles, boats, machinery, and equipment rentals. The vehicle rental micro-business 200 may include a website, smart phone application or other nomadic device that an Owner and Temporary User may use to manage their assets and/or user profile. The following elements within a vehicle rental micro-business 200 may include a process for collecting identification and payment from Temporary User 204, collecting rental consent and agreement 206, distributing a virtual key to the Temporary User and VCS 210, giving the Owner a selection of vehicle parameters to monitor usage of the vehicle including vehicle speed, load capacity, etc. . . . 222, control temporary user's usage 216, and other features that may assist the Owner and Temporary User with the virtual rental experience.

At step 202, the Owner and Temporary User may set up a user profile using a website or a nomadic device communicating with the site that is stored in a database. The Owner may set up a user profile by inputting information into the website or nomadic device including, but not limited to the make, model and year of the vehicle available for rent. The Temporary User may also fill out a user profile using the website or nomadic device to include, but not limited to, photos of credit cards, photo of forms of ID, facial recognition, voice print recognition, matrix barcode (ex. two-dimensional code), code word or phrase for speech recognition, temporary mobile web login IDs and password, or other types of unique Temporary User identification to validate and pay for the rental service at step 204.

At step 206, the Owner may collect the monetary compensation in exchange for the use of his vehicle. The Owner and Temporary User may agree to terms and conditions for the rental period using the website or nomadic device. The Owner may create a standard rental agreement form, or may develop a custom form based on the type of use the Temporary User is requesting to use the vehicle for. For example, if the Temporary User wants to use the Owner's vehicle to move furniture, the Owner can tailor the rental agreement to include what can and cannot be transported. The Temporary User and Owner can sign the consent and agreement using the website or the nomadic device at step 208.

At step 210, once the Temporary User selects the vehicle, pays the appropriate amount and signs a consent agreement, than the system may generate a virtual key to distribute to the Temporary User and VCS. The virtual key may be sent to, but not limited to, the website for the Temporary User to view, sent through an email, or to the Temporary User's nomadic device at step 212. The virtual key may also be sent to the vehicle configuring the VCS to enable the keyless drive system for the appropriate Temporary User during a given rental period.

At step 214, the Owner may have access to control usage of the vehicle being rented by the Temporary User. The Owner may set user restrictions by use of the website or nomadic device. The restrictions may be based on, but not limited to, the owner's selection of parameters including, but not limited to, speed, global position coordinates, or load weight restrictions. At step 216, the control parameters use restrictions may be monitored and if a restriction exceeds a limit the Temporary User and Owner may be notified. The monitoring information may be sent to the Owner through the website, with an email notification, or on the Owner's nomadic device at step 220. Email notification, text messages or an in-vehicle display message may be sent to notify the Temporary User if a restriction limit has been exceeded at step 218.

At step 222, control use may limit the Temporary User from exceeding the restrictions the Owner has set by several remedial actions that may reduce or stall vehicle performance. The remedial actions may include, but not limited to, reduce engine power, engine shut down, and immobilization. The reduce engine power remedial action may reduce engine power, limiting vehicle speed. An exemplary example of control usage may be limiting the Temporary User from driving to restricted areas defined by the Owner based on the rental terms and conditions. If the Temporary User enters a restricted area, he may be notified by the system and the vehicle may enter a remedial actions limiting vehicle speed.

Another exemplary example of monitoring vehicle parameters may be the use of the rental vehicle to haul cargo; if the Temporary User exceeds the max cargo weight limitation set as a numerical value by the Owner, the engine may enter a remedial action preventing the Temporary User from starting or stalling the vehicle. Additional vehicle variables being monitored by the Owner may include, but not limited to, vehicle diagnostics, in-vehicle cabin activity, and driver performance. Vehicle diagnostics may include, but not limited to, tire pressure, fuel level, trailer towing, and additional vehicle performance variables monitored by the VCS. In-vehicle cabin activity variables may include, but not limited to, unauthorized pet detection, a smoke detector, interior-viewing video camera, authorized driver verification, and audio control activity. Driver performance variables may include, but not limit to, braking, steering, throttle and accelerator pedal positions.

At step 224, the system may notify the Temporary User that the agreed upon rental period may expire soon, and if the rental period has ended the system may prompt the Temporary User with a message asking if he would like to purchase additional rental time. The system may allow the Temporary User to purchase additional rental time or decline the offer with the use of the vehicle touchscreen display or a nomadic device at step 226. If the rental term has ended, and no additional time is purchased, the system may begin the vehicle rental exit process within the VCS at step 228. If the rental period is still within the agreed upon rental period, the system may carry on to monitor the vehicle allowing the Owner continued control of the vehicle with the use of vehicle restriction limits initially set by the Owner at the beginning of the rental term. At step 226, if the Temporary User decides that he may need to purchase additional rental time, the system may update the new rental period end time restriction and continue to monitor usage of the vehicle.

Another exemplary example of the vehicle rental micro-business system may include other enhancements including, but not limited to, matrix barcode (ex. two-dimensional code) used as the virtual key being recognized by the VCS. The smart phone may be used to communicate the matrix barcode information to the vehicle rental micro-business system directly. The system may be able to communicate information from the smart phone to the vehicle notifying the VCS of a virtual key. Once the Temporary User has the matrix barcode scanned by the vehicle, the smart phone may be able to connect with the VCS and be used to enter and enable the vehicle drive away event.

While the virtual key disclosed herein may be implemented in the manner as set forth above, it is recognized that the virtual key feature may be implemented as a key ignition device as set forth in U.S. Publication No. 2009/0198445 (the '445 publication) to Miller et al. which is hereby incorporated by reference in its entirety. For example, the key ignition device generally provides a driver status signal indicative of whether the driver is a primary driver (e.g. owner, parent, employer, etc.) or a secondary driver (e.g. temporary user, teenager, employee, etc.). A controller as disclosed in the '445 publication receives the driver status signal and controls various vehicle features and/or functionality based on the identity of the driver as provided on the driver status signal. In this case, multiple ignition key devices may be provided. For example, a first ignition key device may be provided to transmit a first driver status signal indicating that the driver is the Owner of the vehicle. In addition, a second ignition key device may be provided to transmit a second driver status signal indicating that the driver is the Temporary User. In the event the vehicle detects that the driver is the Owner of the vehicle based on the first driver status signal, the vehicle may grant vehicle functionality to the Owner. In the event the vehicle detects that the driver is the Temporary User based on the second driver status signal, vehicle functionality may be restricted or limited in view of the teachings as set forth herein.

Figure 3A:
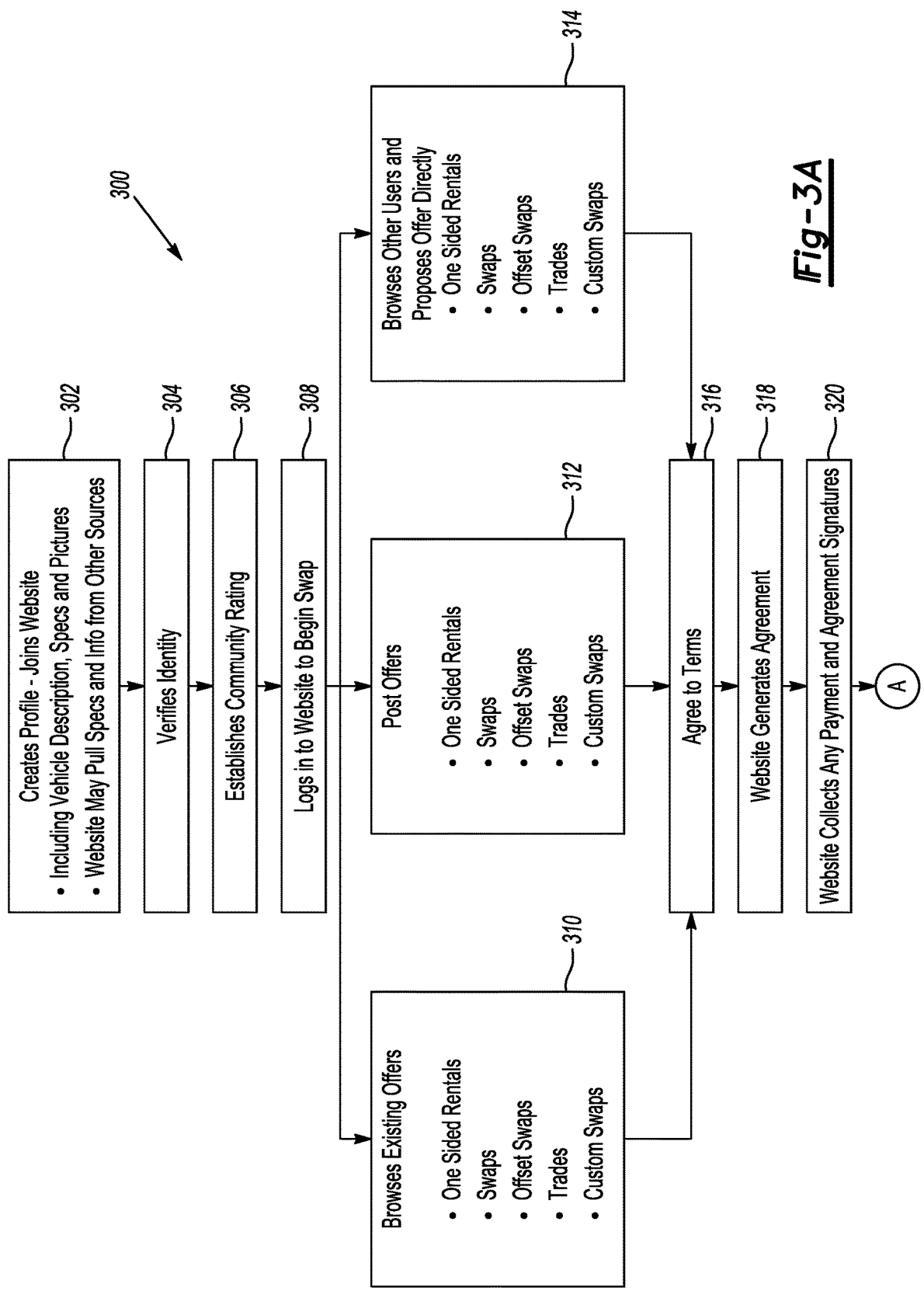
FIG. 3A is a flow-chart illustrating an example method of a vehicle rental micro-business having vehicle monitoring and control features.
Figure 3B:
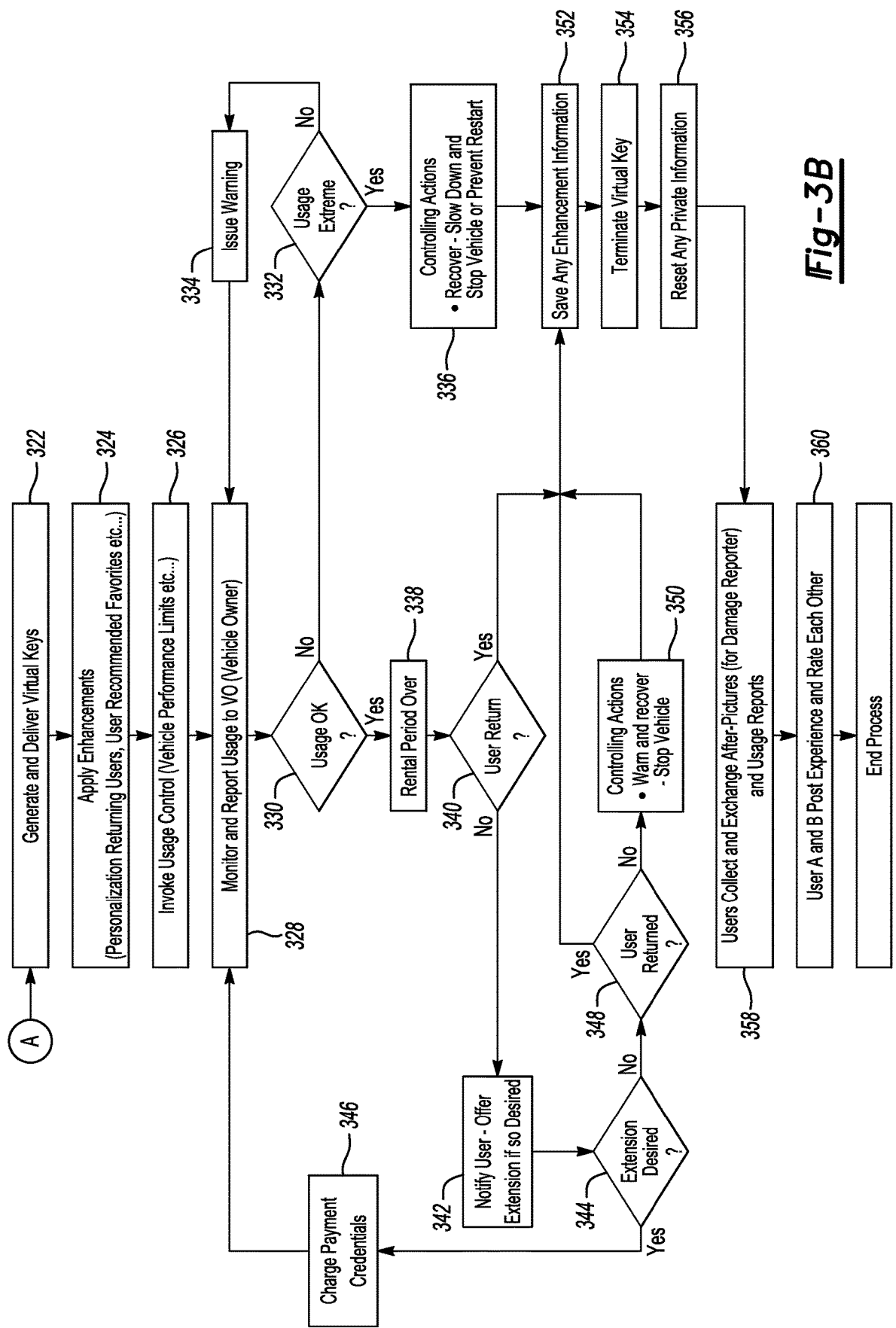
FIG. 3B is a continuation of the flowchart of FIG. 3A illustrating an example method of a vehicle rental micro-business having vehicle monitoring and control features at A.

FIG. 3 is a flow-chart illustrating an example method of a vehicle rental micro-business having vehicle monitoring and control features. For example, and without limitation, the vehicle rental micro-business method may be used to include other services including, but not limited to having Temporary User's offer trades, offset swaps, and one sided rentals. At step 302, a vehicle Owner and Temporary User creates a user profile submitted through a website. The vehicle owner joins the website and may submit vehicle information including, but not limited to, vehicle description, specifications, and pictures at step 302. The website may be able to pull in addition vehicle specification and information from other sources. The vehicle Owner may include additional information, including but not limited to, setting up a deposit account, for example a paypal account. The vehicle Owner may then update and verify their information and identification within the website at step 304.

After a Temporary User setups their user identity within the website, the Temporary User may begin to use the vehicle rental services. The Temporary User may establish a community rating 306 based on past experiences and services with other vehicle owners that use the site. The Temporary User can log-in to the website to begin browsing the database of available vehicles to rent at step 308. Once the Temporary User is logged-in they may browse existing rental offers available, which may include, but not limited to, one sided rentals, swaps, offset swaps, trades, and custom swaps at step 310. At step 312, the Temporary User may also post offers of offset swaps, one sided rentals, and trades. The Temporary User may also browse other users and proposes an offer directly at step 314. When the Temporary User and vehicle Owner agree to terms 316 the website may generate the exchange or propose a rental agreement 318. The agreement between the Owner and Temporary User can be signed and payment made through the website at step 320. The agreement to rental terms and conditions between the parties may be done with the website using smart phones or a smart phone application, or any other type of nomadic device. Rental conditions may also be displayed on the vehicle's touchscreen visual display and accepted or rejected through the touchscreen visual display. Acceptance may be sent back to the Owner over the wireless network. A Temporary User may also access the Owner's web page to view and accept rental terms and conditions online at step 320.

At step 322, after identification of the Temporary User with an accepted agreement and payments made, the vehicle rental micro-business system may generate and deliver virtual keys to the Temporary User. The virtual key may allow a Temporary User temporary granted access to the Owner's vehicle. The granted access allowed by the virtual key may permit entry of the vehicle; grant a keyless drive-away of a vehicle, and/or both. The Temporary User may enter a virtual key outside or inside the vehicle, while credential authorization may be processed by the VCS, a server and/or by the vehicle Owner.

The system may be further extended to facilitate the virtual key with additional security by requiring remote credential verification at the vehicle. The remote credential verification at the vehicle may be done with additional hardware assembled on the exterior of the vehicle or in the vehicle cabin. The remote credential verification may be done by the VCS, using a server, or allowing the Owner to verify the Temporary User's request. For example, but not limited to, the Temporary User entering a credential verification password at the vehicle's touchscreen visual display while having the VCS, server, or owner compare and verify authorization. Once the Temporary User has completed the rental period and returned the vehicle to the appropriate drop off, the virtual key may terminate allowing the system to reset any private information stored on the vehicle-based computing system.

At 324, the Temporary User may have vehicle preset settings applied when renting a vehicle. These enhancements may include, but not limited to providing the Temporary User with stored frequent destinations sent to the VCS, radio presets, seat and mirror position, and ambient lighting preferences. The personalization of returning user's may also include a "bread crumb" feature allowing users to mark their usage to leave future users recommendations including which restaurant to eat at, or which routes to avoid.

At 326, the VCS may implement assigned vehicle control limitations during the use of the rental term by mitigating vehicle performance while preventing the Temporary User to exceed a limitation set by the Owner. The Owner may have the options to set rental restrictions based on, but not limited to, speed, destination location, or load weight limitations. Controlling usage to enforce compliance with the rental agreement terms may be of more importance to a vehicle rental micro-business owner as this may be the only vehicle the Owner possesses. These restrictions can be input using the vehicle rental website, a smart phone application or the Owner's nomadic device interacting with the VCS.

At 328, the control usage of the vehicle by the Temporary User may be monitored by the vehicle owner. The vehicle may be able to monitor and record its location, speed, and driving behavior while transmitting this information to the vehicle owner. Another exemplary example of the monitoring feature may be the use of RFID tags or CAN network monitoring of particular components of the vehicle that may be tampered with or removed. The use of RFID tags and/or the CAN network may allow the user to get additional vehicle information during the vehicle rental period or at the end of the rental period.

At 330, the VCS may monitor that a restriction threshold has been violated indicating that the Temporary User may be abusing the vehicle. At step 332, the Temporary User operating the vehicle under excessive conditions may cause the system to send an issue warning to the vehicle display information center. At step 334, the system may send a message to issue a warning to the Temporary User notifying of unauthorized usage of the vehicle at the display information center, instrument cluster, and/or other driver display device. If the system detects that the usage of the vehicle is extreme by exceeding a predetermined threshold, the VCS may command controlling actions to put the vehicle in a remedial action at step 336. The remedial actions may include, but not limited to, reduce engine power, engine shut down, and immobilization. The VCS may monitor and detect the Temporary User exceeding a restriction limit and may notify the Owner while implementing remedial actions that may include preventing the vehicle from being started. The display message to alert the Temporary User of a restriction violation may be sent to the vehicle display information console and/or to the temporary user's nomadic device.

At 330, the VCS may continue to monitor the vehicle for the entire rental period. If the rental period is soon to expire the system may notify Temporary User at step 338. If the Temporary User has not returned the vehicle at the time the rental period has expired, the system may notify the user if a rental term extension is desired at step 342. If the extension term is desired, the Temporary User may be prompted to accept additional rental charges at step 344. The Temporary User may be charged for the additional rental time at step 346. If the extension of time is not desired, and/or not allowed by the Owner, the system may transmit controlling action to warn and induce remedial actions at step 350. If the extension of time is not desired, and the Temporary User is within the allocated time and distance to return the vehicle to the required parking location at step 348. If the Temporary User has returned to the required parking spot, the system may begin to prepare for return to the vehicle Owner. During the preparation to return vehicle to Owner and end the rental period, the system may save any enhancements information based on the Temporary User's settings at step 352.

At step 354, once the Temporary User has completed the rental period and returned the vehicle to the appropriate drop off, the virtual key may terminate. Once the virtual key has terminated, the system may reset any private information stored on the vehicle-based computing system by the Temporary User at step 356. The Temporary User may collect pictures to report status of the vehicle to the Owner after the rental period has ended at step 358. The system may include a standardized report form that requires certain information the Temporary User must fill out when returning the vehicle, including pictures. After the rental experience, the Owner and Temporary User may rate their experience on the website to notify others of their satisfaction each person had during the transaction at step 360.

Figure 4:
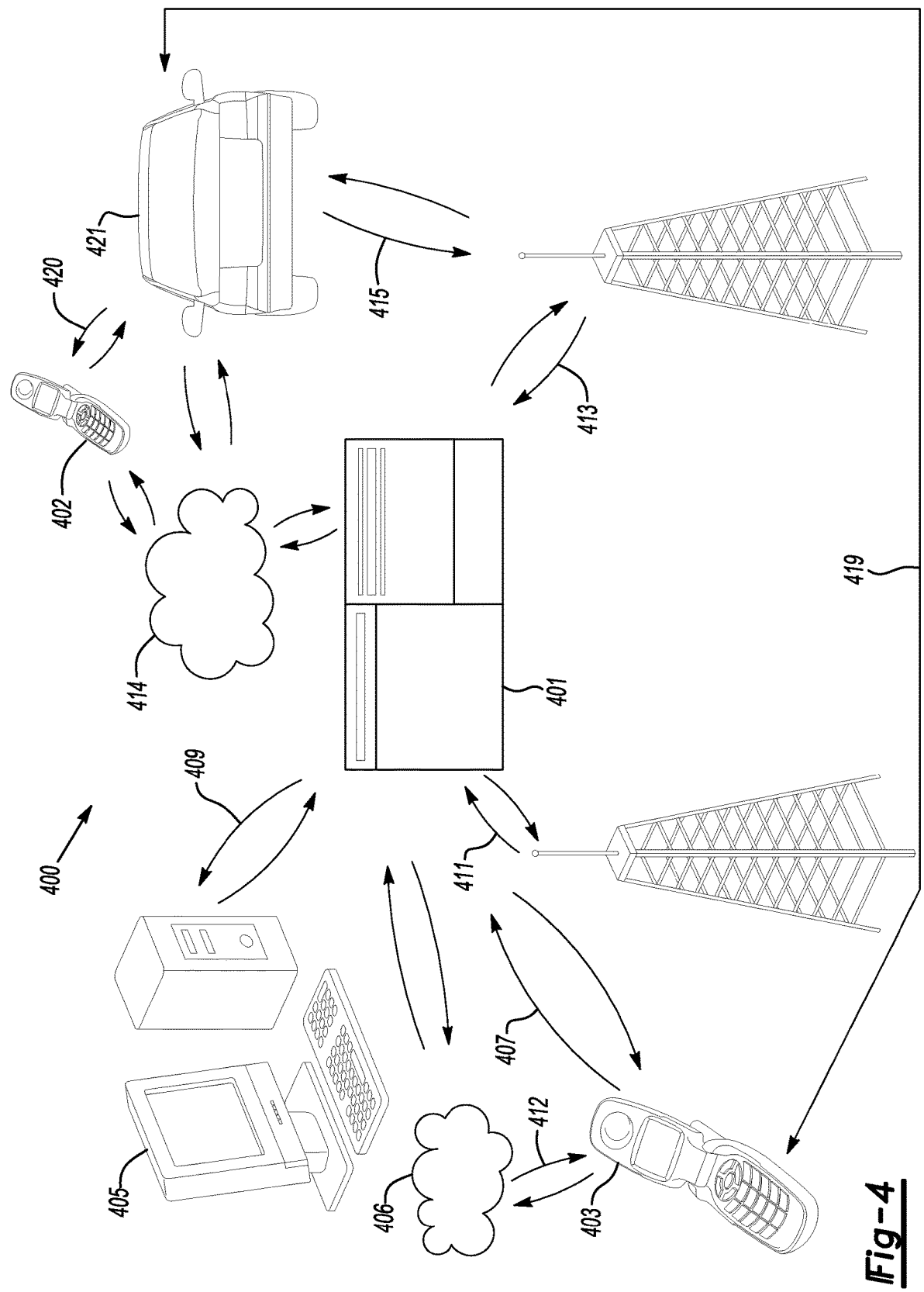
FIG. 4 shows an illustrative example of a communication system through which a nomadic device can communicate with a vehicle according to one of the various embodiments.

FIG. 4 shows an illustrative example of a communication system through which a wireless communication device can communicate with a vehicle 421 to enable a vehicle rental micro-business. In this illustrative embodiment, a nomadic device (e.g., without limitation, a cellular phone, a personal cellular telephone) 403 is used to send a communication through a cellular network 407. This communication is relayed through a network 411 (e.g., without limitation, the cellular network, the internet, etc.) to a centralized system 401. In another embodiment, the nomadic device 403 may send a communication through network 412 which may include, but is not limited to, WiFi or WiMax. This communication is relayed through a network 406 (e.g., without limitation, cloud computing, the internet,) to a centralized system 401.

In this illustrative embodiment, the centralized system is a server system that includes processing capability for incoming nomadic device signals designated to interact with a remote vehicle 421. For example, the server(s) 401 may include an automated call server and/or web host. Further, the server(s) 401 may route an incoming signal from a nomadic device (ND) 403 to the appropriate remote vehicle to enable a Temporary User keyless access and drive away capabilities of the Owner's vehicle. Data sent in this fashion may be sent using data-over-voice, a data-plan, or in any other suitable format.

Data can also be sent to the vehicle 421 through the server(s) 401 using a personal computer 405. In this case, the data is likely, although not necessarily, sent over the internet 409. Once the server(s) 401 receive the incoming data request from the remote source 403, 405, the message is processed and/or relayed to a vehicle 421 and the Temporary User's nomadic device 402. The vehicle may be identified by a header associated with one or more incoming data packets, or may be identifiable based on a database lookup, for example.

In one embodiment, a message is relayed to the remote source 403, 405 as well. For example, as will be described in further detail below, when an authorized temporary user remotely transmits a request from a Temporary User's nomadic device 402 (e.g., via a button or key press) to receive authorization to operate and drive away the vehicle 421, the server(s) 401 may respond by transmitting an authorization code to both the Temporary User's nomadic device 402 and to the vehicle control system for input by the authorized Temporary User at the vehicle 421. An authorized temporary user may be any individual recognized by the vehicle 421 as an authorized user based on a matrix barcode, a fingerprint scan, an authorized code typed in a touchscreen, voice recognition, and the like. It should be understood that these examples are non-limiting and other means of authorization for the vehicle rental micro-business may be used.

The relay to the vehicle 421 is sent out from the server(s) 401 through a network (e.g., without limitation, a cellular network 113, the internet, etc.) and passed through a cellular network 415 to the vehicle 421. In another embodiment, the relay may be passed through network 414 (e.g., WiFi or WiMax) and to the vehicle 421. A remote communication module in the vehicle 421 receives the signal sent from the server(s) 401 and processes it or relays it to an appropriate processing system within the vehicle 421.

In at least one illustrative embodiment, the vehicle 421 is also outfitted with a communication transceiver, such as, but not limited to, a BLUETOOTH transceiver. This transceiver may allow communication with the nomadic device 403 using a direct signal 419. This transceiver may also allow communication with the Temporary User's nomadic device 402 to the vehicle 421 using a wireless connection 420 including, but not limited to, a smart phone that may connect to the vehicle through SYNC or other Bluetooth pairing device. It should be understood that the communication between nomadic device 403, temporary user nomadic device 402, server 401, and vehicle 421 may be performed in a number of ways and FIG. 4 is presented for illustrative purposes. FIG. 4 illustrates various alternatives for communicating data. For example, and without limitation, data communication may be partially or entirely cellular or WiFi, or a combination of cellular and WiFi.

Figure 5:
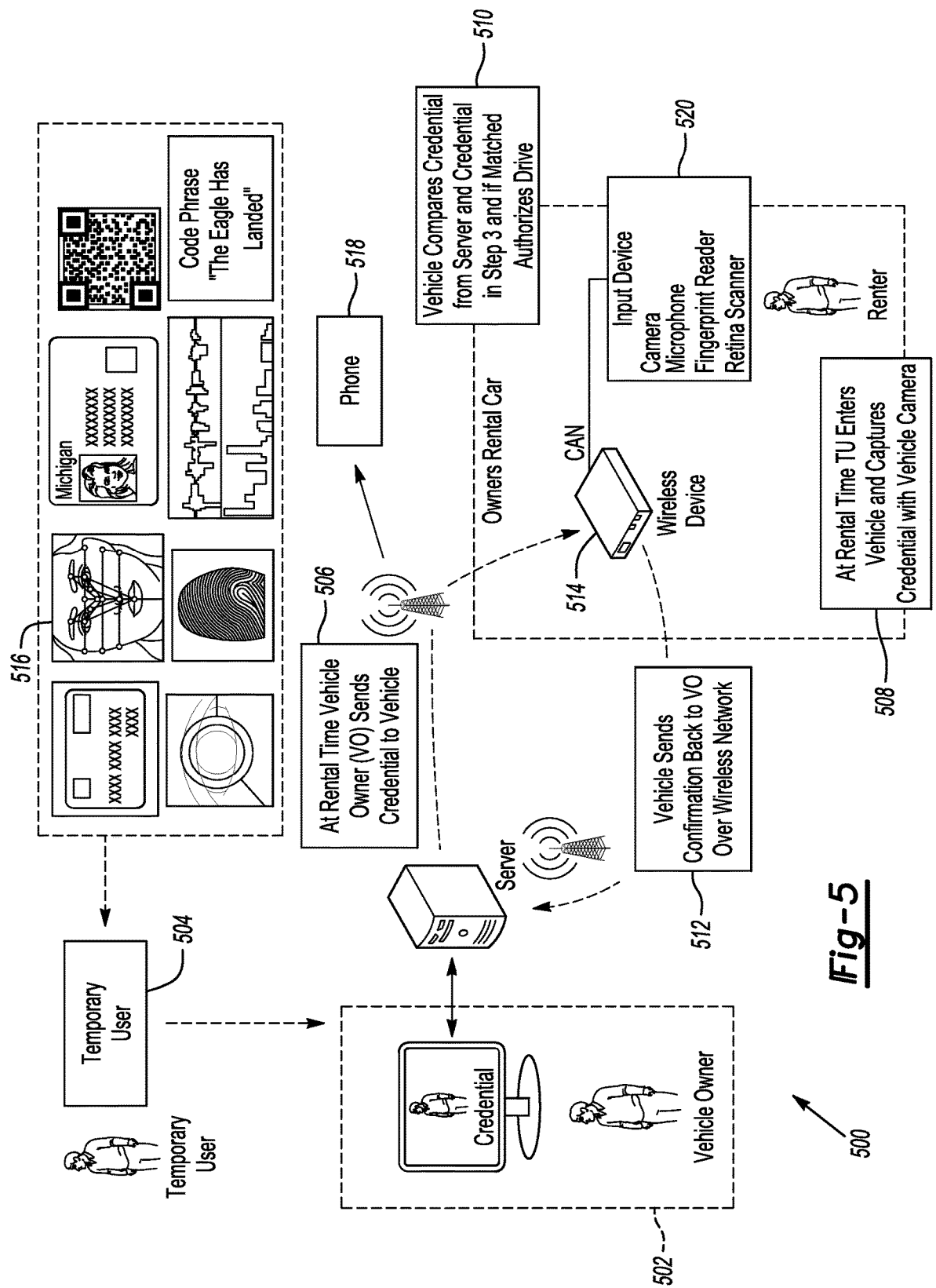
FIG. 5 illustrates a vehicle drive-away authorization and monitoring process for a temporary user according to one of the various embodiments.

FIG. 5 shows an illustrative example of an overview of how the vehicle rental micro-business may be structured with a keyless transaction between the Owner of the vehicle and the Temporary User. This example illustrates the process after the vehicle Owner and Temporary User have already setup a user profile within the database and have both agreed to the rental agreement. At step 502, the vehicle Owner may enter in vehicle authorization credentials based on information received by the Temporary User to set up a virtual key. The virtual key may be sent to the vehicle allowing Temporary User access to the Owner's vehicle.

Additional Temporary User identification 504 may be sent to the vehicle Owner allowing for this information to be entered into the server and used as a virtual key, or in addition to the virtual key, allowing the Temporary User access to the Owner's vehicle while enabling a keyless drive-away. The Temporary User identification and virtual key may be sent in an encrypted message to the VCS, Temporary User's nomadic device, and/or vehicle Owners nomadic device. The Temporary User's information for vehicle authorization credential verification 516 may include, but not limited to fingerprint recognition of user, photos of credit cards, photo of forms of ID, facial recognition, voice print recognition, matrix barcode (ex. two-dimensional code), code word or code phrase for speech recognition, temporary mobile web login IDs and password, or other types of unique Temporary User identification.

The Temporary User's information for credential verification 516 may be collected and exchanged using several methods including, but not limited to, a website, at a vehicle, or through a nomadic device. A website may be developed to have the Temporary User submit information including, but not limited to, forms of ID, driver license, facial pictures, fingerprints, code phase and/or credit card information. A vehicle may also be equipped to collect and exchange the Temporary User credential verification with the use of additional hardware mounted on the outside or inside of the vehicle. The Temporary User may also use their nomadic device to exchange or collect information for the enablement of a keyless drive-away system.

An example for applying Temporary User credential verification at a vehicle may include, but not limited to, the use of additional hardware integrated with the VCS to allow collection and exchange of information to enable a keyless drive-away rental event. For example, the Temporary User may use their credit card at a vehicle with the use of hardware integrated with the VCS to collect payment credentials, identify the user, and/or agree to rental terms. Another exemplary embodiment of applying Temporary User credentials at a vehicle may be with the use of facial recognition done by having a camera integrated with the VCS.

The Temporary User's information for credential verification may be sent to both the vehicle computer system and the Temporary User's nomadic device 518 including, but not limited to, a smart phone. When the scheduled rental period of time begins the vehicle Owner may send the credentials to the vehicle with the use of a server 506 and the vehicle may be able to receive the information using a wireless device 514. The wireless device 514 may include, but not limited to, an embedded cellular modem, embedded WiFi device, Near Field Communication connected phone, brought-in cellular device like a USB modem, MiFi, smart phone that may be connect to the vehicle through SYNC or other Bluetooth pairing device, or a PC (ex. IPAD) that may be connected to the vehicle through SYNC or other Bluetooth pairing device. Additional hardware input device 520 for credential verification may include but not limited to a camera, microphone, matrix barcode scanner, fingerprint reader, or retina scanner integrated with the vehicle control system.

At step 508, the Temporary User may use their virtual key credential to access the vehicle. The virtual key credential can be collected via email, phone message or other established method or in a novel way presented here; or this can be collected by the vehicle itself through various input devices which may be connected to the VCS using a camera, matrix barcode scanner, optical scanner, fingerprint scanner or microphone. Once the Temporary User enters the vehicle and captures the credentials with one of the methods mentioned above, the vehicle may verify that the Temporary User has approval to use the vehicle.

At step 510, the vehicle may verify the Temporary User's virtual key by communicating with the server to compare the credential and verify Temporary User's access. The vehicle using the wireless device to transmit confirmation back to the vehicle Owner 512 through a telecommunications network notifying that the Temporary User entered the vehicle and has commenced the vehicle rental agreement. Once the rental period has expired the virtual key may be reset and cleared from the VCS.

Figure 6:
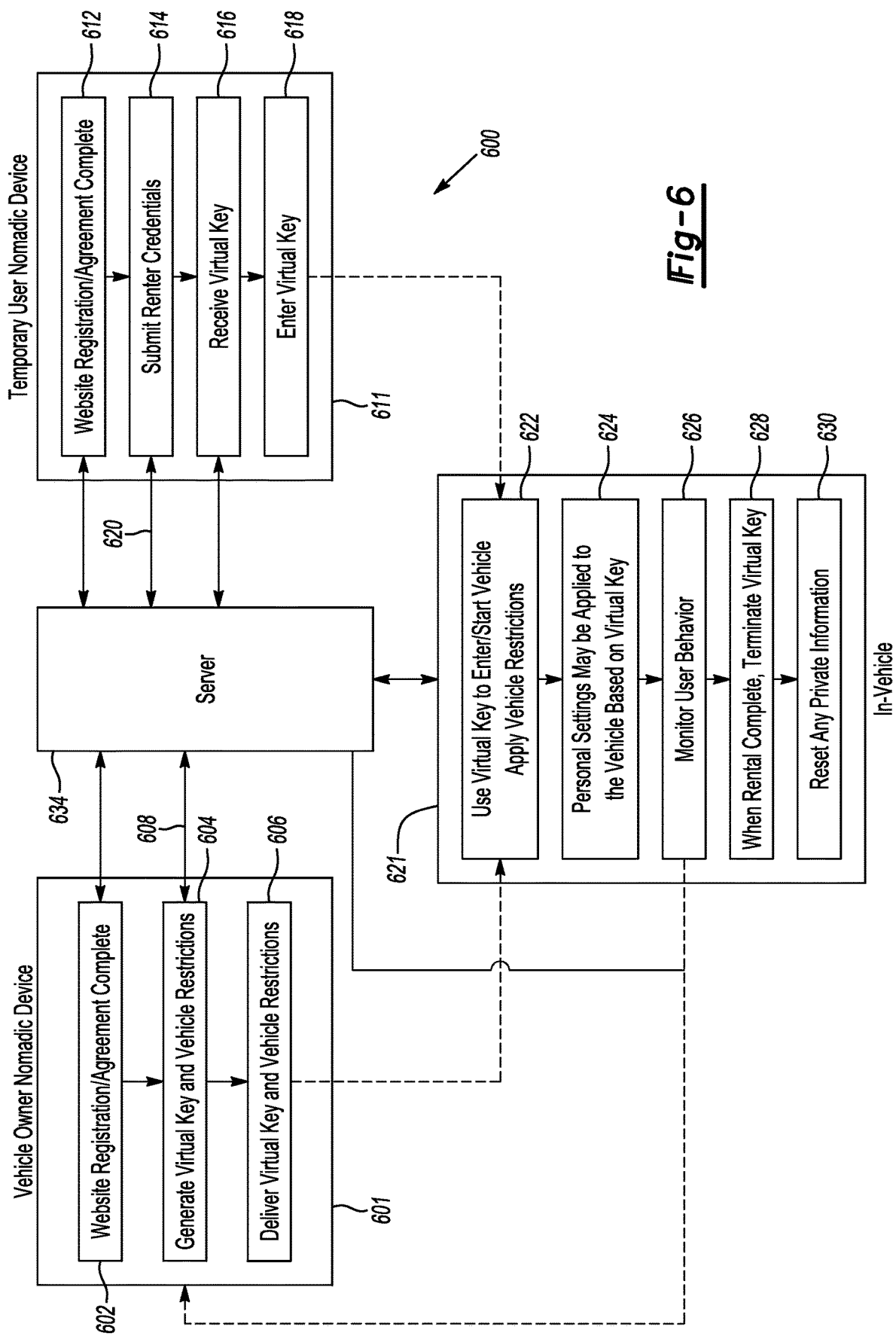
FIG. 6 is a flow-chart illustrating an example method of the authorization process between a vehicle owner and temporary user.

FIG. 6 is an exemplary embodiment of the vehicle rental micro-business distributing and controlling virtual keys using a nomadic device with a vehicle. The vehicle rental micro-business administrative system may consist of a computer system configured to host one or more websites for interaction with a vehicle Owner and Temporary User. In the illustration 600, a server 634 is used to communicate between a vehicle Owner nomadic device 601, a Temporary User nomadic device 611, and a vehicle computing system 621. Using a nomadic device, for example a smart phone, a Temporary User and vehicle Owner may set up user profiles, enter into an agreement and make a payment to initiate the vehicle rental process between the two parties at step 602 and 612. At step 604, the vehicle Owner may then generate a virtual key based on a password generated by the vehicle Owner that may include a matrix barcode or a code word that the Temporary User may enter/send to the vehicle when ready to begin the rental term. Another exemplary embodiment of generating a virtual key may be done by using Temporary User's credentials including fingerprint recognition, photos of credit cards, photo of forms of ID, facial recognition, voice print recognition, phrase for speech recognition, temporary mobile web login IDs and password, or other type of unique Temporary User identification at step 614. At step 616, the virtual key is generated and sent to the Temporary User. The Owner may deliver a virtual key to the vehicle for recognizing the Temporary User having authorization to enable a keyless drive-away at step 606.

At step 622, when the Temporary User arrives at the vehicle within the scheduled rental time, he or she may enter the virtual key using several methods. One method may include having the Temporary User scan their finger with the use of a fingerprint scanner integrated with the VCS to validate authorization to access the vehicle. The Temporary User's virtual key may be authorized several ways including, but not limited to, at the vehicle, communicated back to the vehicle rental authorization server using a telecommunications network, or by having the vehicle Owner verify access using their nomadic device.

At step 618, the Temporary User may send the virtual key to the server requesting access to the vehicle, or use a vehicle input device, like camera, microphone, fingerprint scanner or retinal scanner integrated with the VCS to capture his identity and/or payment credentials to enable a keyless drive-away. If it is the scheduled time for the rental, the vehicle may compare the identity credentials just inputted at the vehicle and the one previously sent virtual key to the vehicle from the vehicle Owner to determine authorization. If the comparison is successful, the vehicle may enable drive-away access to that Temporary User for the scheduled time period of the rental agreement. For the duration of the rental term, the Temporary User may again input the same identifying credentials to unlock and drive.

At step 624, the Temporary User's nomadic device may be paired with the VCS and may send personal settings to the vehicle including, but not limited to, radio station presets, navigation routes, and/or preferred climate control settings. Another exemplary example of setting personal preferences may include, but not limited to, facial recognition to recognize the driver using a camera mounted in the vehicle cabin on the dash. Once the camera recognizes the Temporary User, the VCS may request additional user settings and preferences including seat adjustment, and climate control temperatures.

At step 626, during the rental term the VCS may monitor the Temporary User's utilization of the vehicle including, but not limited to, renter verification, driving behavior, vehicle location, speed, fuel level, and other vehicle information requested by the vehicle owner. For example, the system may monitor that the actual authorized renter is the one driving the vehicle with the use of an interior viewing camera embedded with facial recognition software. The monitoring information is sent to the vehicle owner, and may have other additional parameters that may only be sent to the owner if they exceed or violate a restriction limit. These additional parameters may include, but not limited to speed limits, weight limits, or "No-Go Zones" which are prohibited areas where the owner does not want their vehicle to be used.

At the end of the rental term, the vehicle may warn the customer of the time expired either on the vehicle touch-screen visual display or over a remote device while preparing to take a predetermined action—probably a series of increasing actions from warning and tracking to slowdown or shutdown of the vehicle. At step 628, once the schedule rental is complete the virtual key may be terminated, allowing the vehicle to be secured for either the Owners entry or the next temporary user scheduled to use the vehicle. Any personal settings or private information entered onto or within the VCS by the Temporary User may be reset after the schedule rental period has been complete at step 630.

Figure 7A:
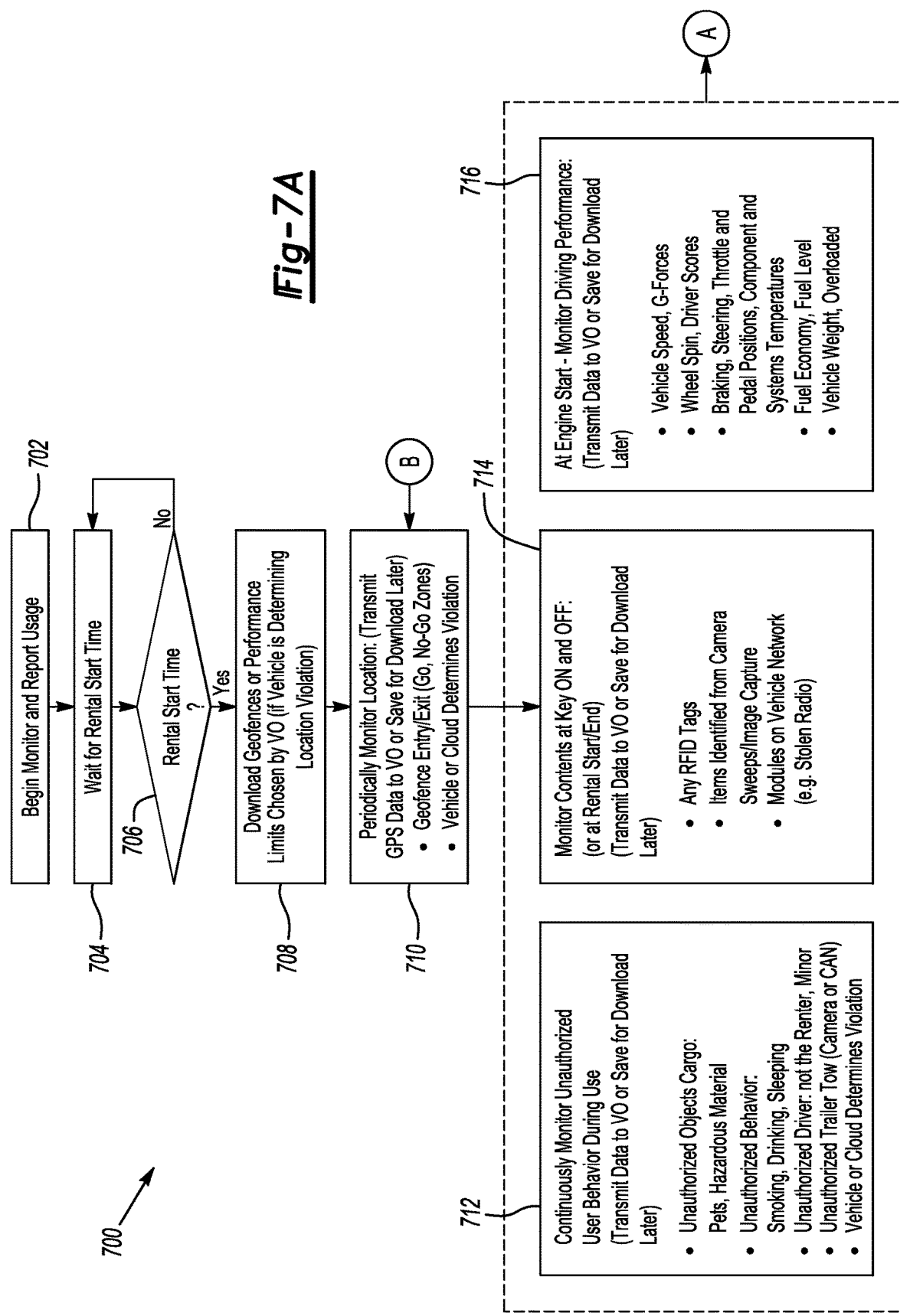
FIGS. 7A & 7B show an illustrative example of monitoring a vehicle rental micro-business.
Figure 7B:
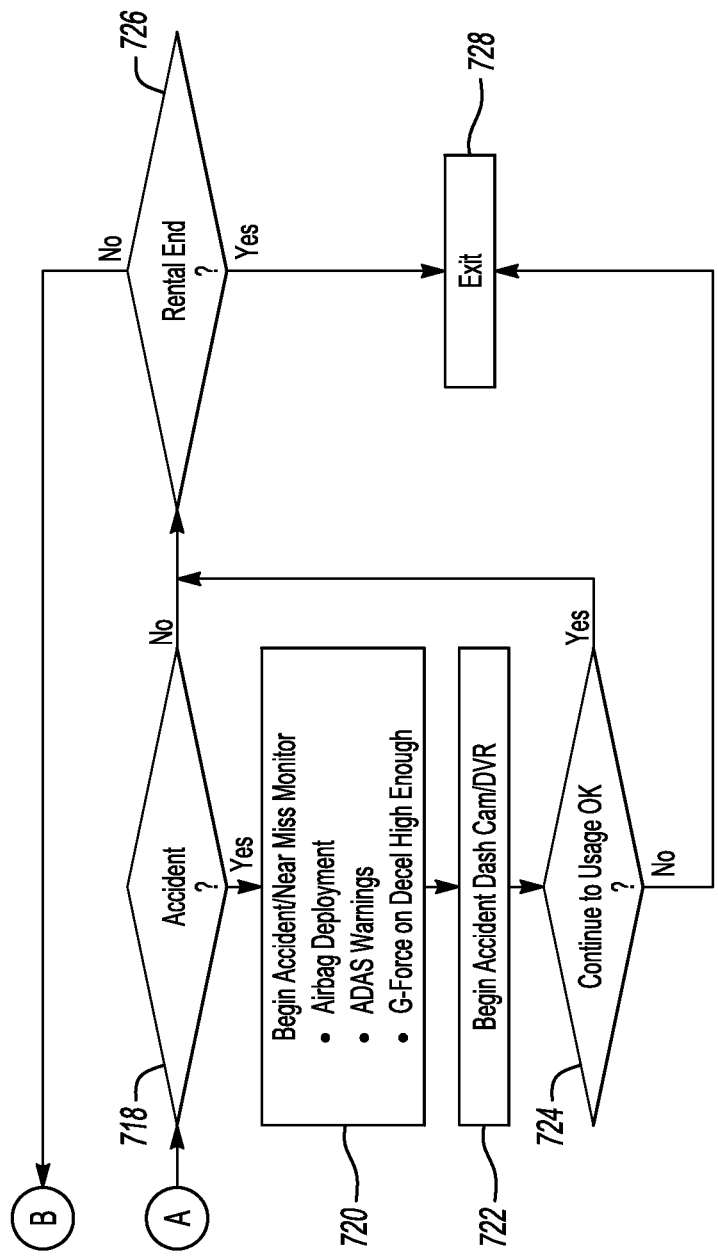

In the illustrative embodiment as shown in FIG. 7 is an overview of a vehicle rental micro-business monitoring process integrated with a VCS. At step 702, the VCS may begin monitoring and report usage of the vehicle to the owner. The system may wait for the rental period to start at step 704. Once the Temporary User initiates the rental event, the system detects a rental time start at step 706. The system may begin to download performance limitations and restrictions assigned by the vehicle owner at the start of the rental period at step 708. The performance limitations and restrictions downloaded to the VCS may include, but not limited to: setting a top vehicle speed, limiting the cargo load, and alerting the vehicle owner if the driver enters an area deemed to be prohibited by the owner.

At step 710, the monitoring of the vehicle's location may be done to reassure the vehicle owner that their asset is being driven in an approved manner and area. The GPS data may be transmitted to the server and monitored using the vehicle owner's nomadic device. The continuous monitoring of the Temporary User's behavior during the rental period may be transmitted to the server, sent to a nomadic device, or stored for a later download at step 712. The monitoring done by the vehicle rental micro-business may include, but not limited to, unauthorized objects or cargo, unauthorized driving behavior, unauthorized driver, and/or an unauthorized trailer tow. The methods to accomplish the monitoring of the mentioned examples above may include, but not limited to, using a camera system, biometric recognition, and the VCS monitoring sensors and subsystems throughout the vehicle.

At step 714, monitoring may start and end when the ignition key is turned on and off. In an exemplary example when the vehicle ignition is off, the monitoring may allow the VCS to wake up periodically to check certain performance limits and components identified using RFIDs. The components using an RFID may be parts that could be high left items, or easily removed from the vehicle including, but not limited to, radios, navigation systems, catalytic converters, and wheels. When the vehicle ignition is on, the monitoring is continuous using RFIDs placed on certain vehicle components while transmitting data to the vehicle owner. The vehicle owner may have a further sense of security knowing high theft items are intact with intermittent and continuous monitoring features no matter if the ignition is on or off.

At step 716, once the vehicle ignition is on, the monitoring of driver behavior is done by the VCS. This information is transmitted to either the server, directly to the vehicle owner's nomadic device, or saved on a storage device for later download. The vehicle owner may review the monitored data at a given time throughout the rental period. The monitoring of driver behavior events includes, but not limited to, vehicle speed, acceleration force, wheel speed, breaking, steering, vehicle weight, throttle and pedal position. The vehicle owner may understand based on the data if the Temporary User is using the vehicle under extreme circumstances or if they are driving responsibly. An example of using the vehicle under an extreme circumstance may include driving the vehicle at excessive vehicle speeds.

At step 718, the vehicle owner may also be notified if the system has a detected driver behavior event. The vehicle owner may be sent information that the Temporary User has been in an accident or near miss based on airbag deployment, accelerometer data, and/or anti-lock brake information. If the Temporary User is involved in an accident, the system may store and save previous recorded data leading up to the accident at step 720. For example, if the airbag is deployed the VCS may save three minutes of all monitored data leading up to the airbag deployment including, but not limited to, a dashboard camera, accelerator pedal position, speed, and brake pedal position at step 722. The monitoring system may continue to check to see if continued usage of the vehicle is acceptable based on the accident data/near miss data to determine if the vehicle is safe for continued operation at step 724. At 726, if the vehicle is in an acceptable condition for continued usage and rental time has not expired, the system may continue to monitor the vehicle rental usage. If the vehicle cannot be used, the VCS may begin the vehicle rental exit mode process at step 728.

At step 718, if the VCS monitoring detects no accident, and the rental period has not expired, the system may continue to monitor the vehicle rental usage. If the rental period has ended, the monitoring and control system of the vehicle rental micro-business may begin to start its Temporary User vehicle rental exit mode process at step 728. The exit mode process may include the monitoring system to store additional variables and data to report to the vehicle Owner including, but not limited to, vehicle location, fuel level, and additional vehicle diagnostic information. The exit mode process may also include, but not limited to, terminating the virtual key while allowing the system to reset any private information stored on the vehicle-based computing system. The system may include a standardized report form that requires certain information the Temporary User must fill out when returning the vehicle.

Figure 8:
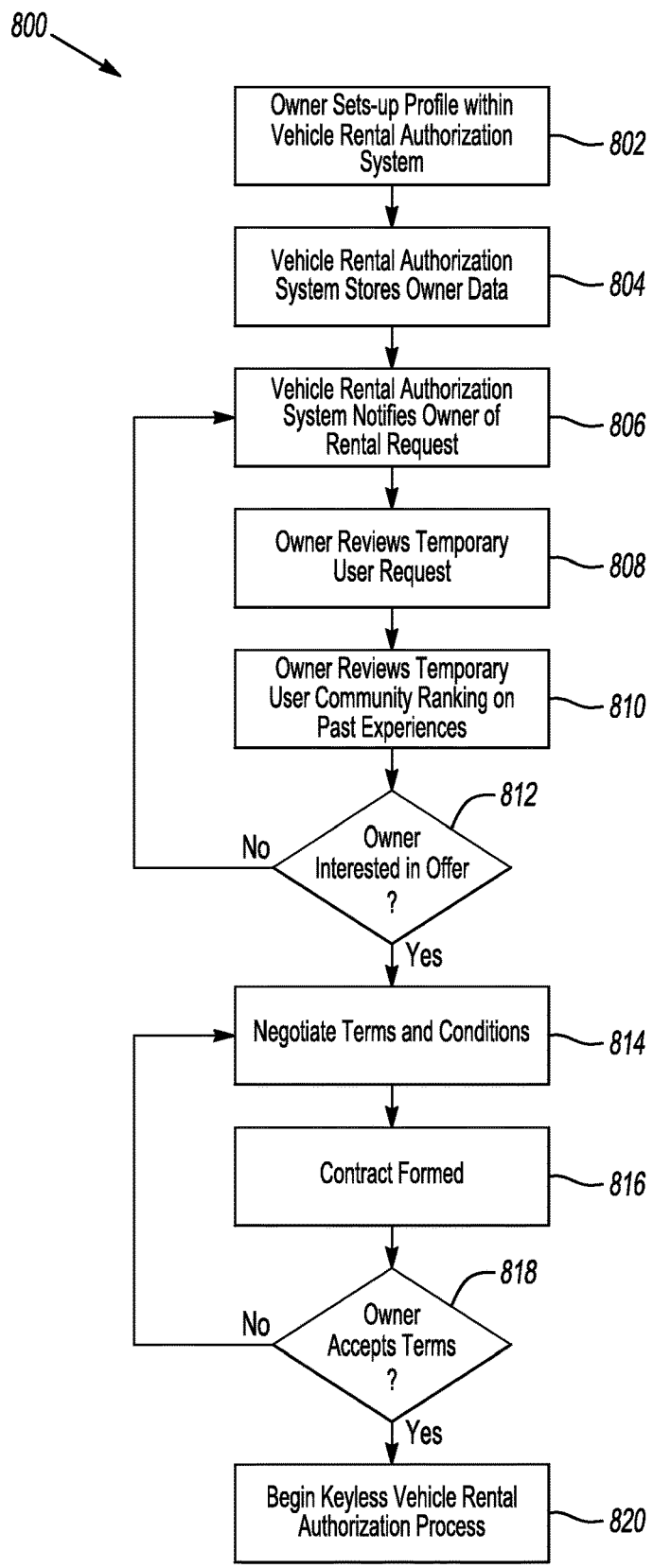
FIG. 8 is a flow-chart illustrating an example method of a vehicle owner interface with a vehicle rental authorization system.

In the illustrative embodiment shown in FIG. 8 is a flow-chart illustrating an example method of a vehicle owner interface with a vehicle rental authorization system. The owner may begin by setting up a user profile within the vehicle rental authorization system at step 802. The owner may interact with the vehicle rental authorization system through a website. The website may be formatted to allow the owner to input profile information using a personal computer, smart phone or other nomadic device. The user profile may include owner's personal information including details about the vehicle he intends to list as a rental within the vehicle rental authorization system. Information may include, but not limited to, owners name, home address, email address, and vehicle specifications including pictures. The vehicle rental authorization system may have one or more databases with a list of vehicle owners and rental vehicles available.

At step 804, the vehicle rental authorization system stores the owner's data. The data may be organized by the vehicle rental authorization system to allow potential Temporary Users to view vehicle information. Once a Temporary User has selected the owner's vehicle to rent, the vehicle rental authorization system may notify the owner of a rental request at step 806.

At step 808, the vehicle owner may be able to review the temporary user's vehicle rental request. The owner may review the requested rental based on what the Temporary User is looking to use the vehicle for (e.g. without limitation, for towing, hauling, or errands), when the requested use will be taking place, and where. The owner may also review the Temporary Users profile and rental history, to see how they have ranked with past experiences using the vehicle rental authorization system at step 810.

At step 812, if the owner decides he has no interest in accepting the Temporary User's offer, he may decline and wait for the vehicle rental authorization system to notify of any other offers. If the owner has decided to accept the offer he may begin the process of developing terms and conditions of the rental period. At step 814, the owner may negotiate additional terms and conditions based on the specific use and needs the Temporary User may use the vehicle for. These additional terms and conditions may include, but not limited to, cargo load weight restrictions, tow load restrictions, or the amount of miles that can be driven during the rental period. The negotiation of the terms and conditions may be done using the vehicle authorization rental system.

At step 818, once the contract is formed, the Owner and Temporary User may use the vehicle authorization rental system to accept the terms and conditions. The vehicle authorization rental system may begin the keyless vehicle rental authorization process at step 820. The owner may complete the entire vehicle rental process using the vehicle rental authorization system without meeting the Temporary User.

Figure 9:
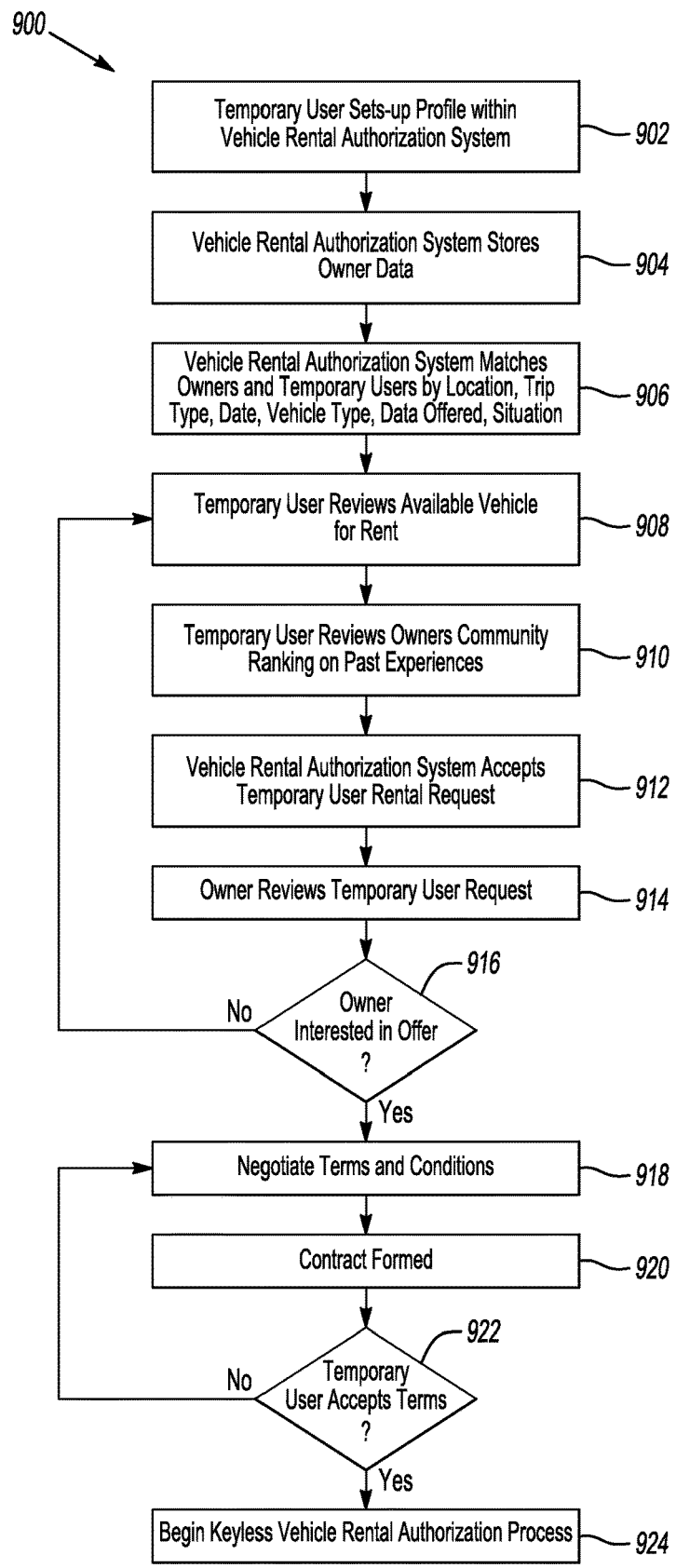
FIG. 9 is a flow-chart illustrating an example method of a temporary user interface with a vehicle rental authorization system.

In the illustrative embodiment shown in FIG. 9 is a flow-chart illustrating an example method of a Temporary User's interface with a vehicle rental authorization system. The Temporary User may begin by setting up a user profile that is saved in a database within the vehicle rental authorization system at step 902. The Temporary User may interact with the vehicle rental authorization system through a website. The website may be formatted to allow the Temporary User to input profile information using a personal computer, smart phone or other nomadic device. The user profile may include Temporary User's personal information including details about the vehicle he intends to rent within the vehicle rental authorization system. Information may include, but not limited to, Temporary User's name, home address, email address, driving record, and a driver's licenses.

At step 904, the vehicle rental authorization system stores the Temporary User's data in a database. The data may be organized by the vehicle rental authorization system to allow vehicle owner's to review this information before renting their valuable asset to the Temporary User. The vehicle rental authorization system may allow the Temporary User to be matched with a vehicle based on location, trip type, date, vehicle type requested, scheduled number of hours needed, a certain day of the week, and vehicle condition at step 906. For example, the Temporary User may have a pickup truck request for this weekend because they need to move furniture. Based on the selection offered by the vehicle rental authorization system, the Temporary User may review the generated output list of vehicles and select the vehicle to rent at step 908. The Temporary User may decide which vehicle to rent not only on vehicle needs and performance, but also looking at what the vehicle owner's community rating is based on past rental experiences at step 910

At step 912, the vehicle rental authorization system may accept the Temporary User's selection of which vehicle he would like to rent. The system may output a notification to the owner of the requested vehicle rental by a Temporary User. The owner may review the Temporary User's request based on several factors including, but not limited to, the use, trip type, and date the Temporary User is requesting to rent the vehicle at step 914. The owner may also review the Temporary User community ranking to determine if he should rent to the interested Temporary User.

At step 916, if the owner decides he has no interest in accepting the Temporary User's offer, therefore declining, the Temporary User may go back and select another potential vehicle to rent. If the owner has decided to accept the offer, he may begin the process of developing terms and conditions of the rental period. The owner may input additional terms and conditions based on the specific use and needs the Temporary User may have for renting the vehicle at step 918. These additional terms and conditions may include, but not limited to, cargo load weight restrictions, tow load restrictions, or the amount of miles that can be driven during the rental period. The negotiation of the terms and conditions may be done using the vehicle authorization rental system. After negotiation of terms and conditions, the authorization rental system may output rental terms for the parties to review.

At step 920, once the contract (e.g. without limitation, a rental contract) is formed, the owner and Temporary User may use the vehicle authorization rental system to accept the terms and conditions. The Temporary User may review the contract and accept the term using the vehicle authorization rental system at step 922. Once the contract is accepted, the vehicle authorization rental system may begin the keyless vehicle rental authorization process at step 924. The Temporary User may complete the entire vehicle rental process using the vehicle rental authorization system without physically meeting the owner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
receive input defining one or more vehicle parameters to monitor using a vehicle computing system;
monitor the vehicle parameters, via the vehicle computing system, during a vehicle rental period, wherein the rental period begins when an authorized user keylessly activates a vehicle during a defined start time and ends when the vehicle is powered down following either a predetermined end time or when the vehicle is returned to a predetermined geographic area; and
initiate communication of the vehicle parameters from the vehicle computing system to a vehicle rental administrative system through a cellular telephone, located in proximity to the vehicle and in wireless communication with the processor.

2. The system of claim 1 additionally comprising a vehicle rental administrative system wherein the vehicle rental administrative system is configured to allow a selection of vehicle parameters to be monitored by the processor.

3. The system of claim 2 wherein the selection of vehicle parameters is done by a vehicle owner's nomadic device.

4. The system of claim 1 wherein the vehicle parameters include global position coordinates.

5. The system of claim 4 wherein the global position coordinates identifies where the vehicle is located at a given time during the rental period.

6. The system of claim 1 wherein the predetermined geographic area is a parking location defined by a vehicle owner.

7. The system of claim 1 wherein the cellular telephone is integrated with the processor.

8. A system comprising:
a processor configured to:
receive input defining a vehicle parameter to monitor, via a vehicle computing system (VCS);
monitor the vehicle parameter, via the VCS, during a vehicle rental period; and
limit vehicle performance, via the VCS, if the parameter exceeds a predefined threshold during the vehicle rental period, the threshold having been dynamically defined for the rental period.

9. The system of claim 8 wherein the vehicle parameter is cargo load weight.

10. The system of claim 8 wherein the predefined threshold includes cargo load weight restrictions.

11. The system of claim 10 wherein the cargo load weight restriction is a set numerical value.

12. The system of claim 8 wherein the limited vehicle performance includes a reduction in engine power.

13. The system of claim 12 wherein the reduction in engine power includes limiting vehicle top speed.

14. A computer-implemented method comprising:
receiving an input defining a vehicle parameter to monitor;
monitoring the vehicle parameter, via a vehicle computer, during a vehicle rental period, the rental period beginning upon vehicle keyless activation during a defined start time and ending upon vehicle power down following either a predetermined end time or when a vehicle is returned to a predetermined geographic area; and
initiating communication of the vehicle parameters from the vehicle computer to a vehicle rental administrative system through a cellular telephone, located in proximity to the vehicle and in wireless communication with the vehicle computer.

15. The method of claim 14 further comprising a vehicle rental administrative system communicating the monitor vehicle parameters to a vehicle owner nomadic device.

16. The method of claim 15 wherein communication to the vehicle owner is done by a server.

17. The method of claim 15 wherein the vehicle owner nomadic device is a smart phone.

18. The method of claim 14 wherein the input defining a vehicle parameter is defined by a vehicle owner.

19. The method of claim 14 wherein monitoring the vehicle parameters corresponds to at least one detected driver behavior event.

20. The method of claim 19 wherein the driver behavior event includes excessive vehicle speeds.

* * * * *